United States Patent
Yamamoto et al.

(10) Patent No.: US 7,437,468 B2
(45) Date of Patent: Oct. 14, 2008

(54) METHOD AND SYSTEM FOR SECURE URL-BASED ACCESS CONTROL

(75) Inventors: Hidenobu Yamamoto, Urayasu (JP); Yukio Ogawa, Suita (JP); Tokuhiro Wada, Nara (JP); Hirofumi Yoshino, Matsubara (JP); Michiko Saitoh, Kobe (JP)

(73) Assignee: International Business Machines Corporation, Armonk, NY (US)

( * ) Notice: Subject to any disclaimer, the term of this patent is extended or adjusted under 35 U.S.C. 154(b) by 1028 days.

(21) Appl. No.: 10/738,703

(22) Filed: Dec. 16, 2003

(65) Prior Publication Data

US 2004/0260821 A1 Dec. 23, 2004

(30) Foreign Application Priority Data

Dec. 27, 2002 (JP) ............................. 2002-381655

(51) Int. Cl.
G06F 15/16 (2006.01)
G06F 7/04 (2006.01)
H04K 1/00 (2006.01)
(52) U.S. Cl. ............................. 709/229; 726/2; 713/182
(58) Field of Classification Search ........................ None
See application file for complete search history.

(56) References Cited

U.S. PATENT DOCUMENTS 6,256,739 B1 * 7/2001 Skopp et al. ................... 726/2
7,054,917 B1 * 5/2006 Kirsch et al. ................ 709/217
2001/0034841 A1 * 10/2001 Shambroom ................ 713/201
2007/0118620 A1 * 5/2007 Cartmell et al. ............. 709/219

FOREIGN PATENT DOCUMENTS

| JP | PUPA 2001-243143 | 9/2001 |
| JP | PUPA 2002-244998 | 8/2002 |
| JP | PUPA 2002-312279 | 10/2002 |

* cited by examiner

Primary Examiner—Wen-Tai Lin
(74) Attorney, Agent, or Firm—Duke W. Yee; Arthur J. Samadovitz

(57) ABSTRACT

System, method and program product performed by a proxy server which forwards an access request from a client to a data server and forwards response data from the data server to the client. A first address location and an encoding format of the response data are stored. A subsequent access request from the client which includes a second address location encoded by the encoding format is received. The second address location is compared to the first address location to determine if the second address location is related to the first address location. In response to a determination that the second address location is related to the first address location, the second address location is decoded based on the encoding format. The data server can be a web server, the response data can be a web page, and the second address location can include the first address. For example, the second address location can be an extension of the first address location.

11 Claims, 10 Drawing Sheets

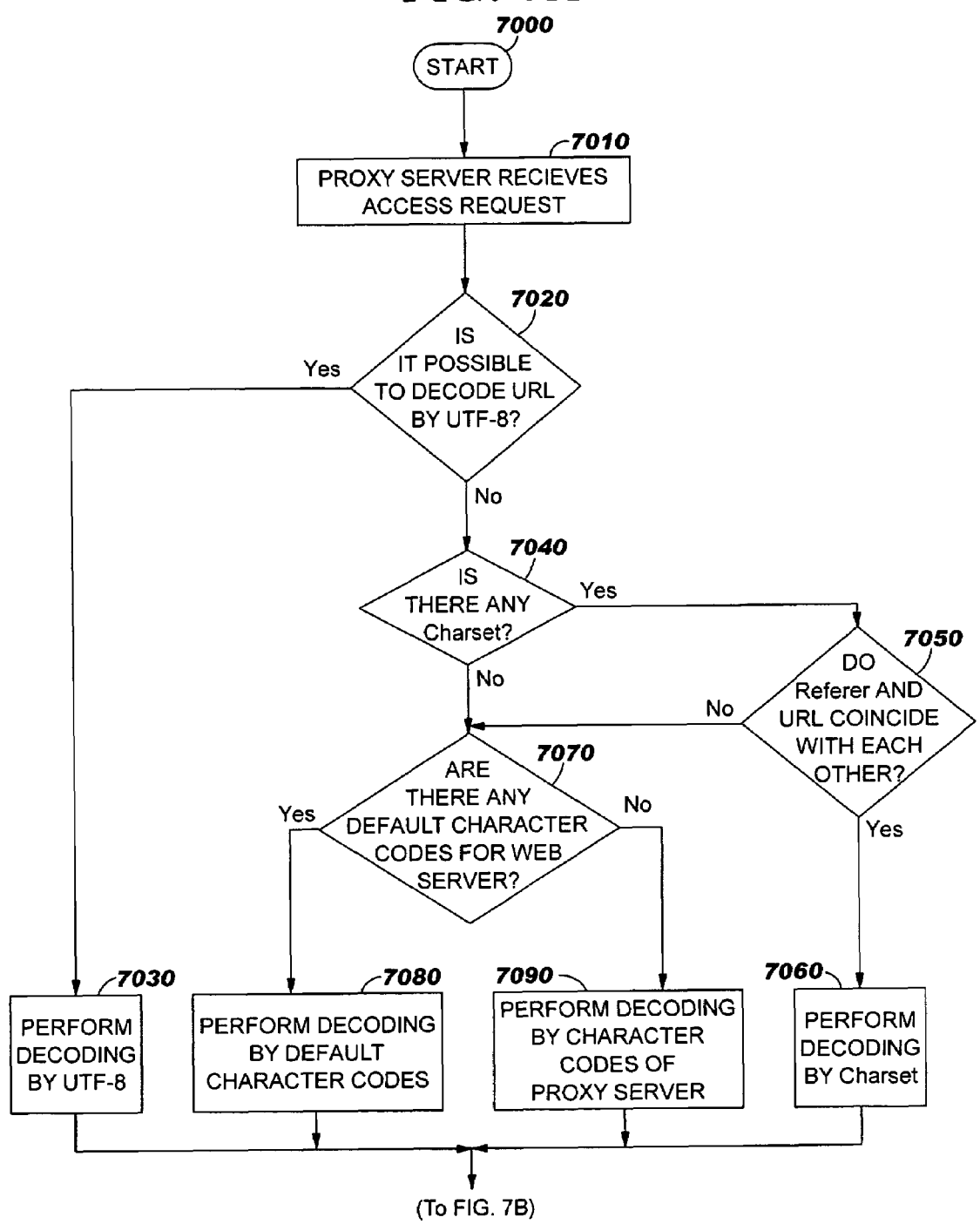

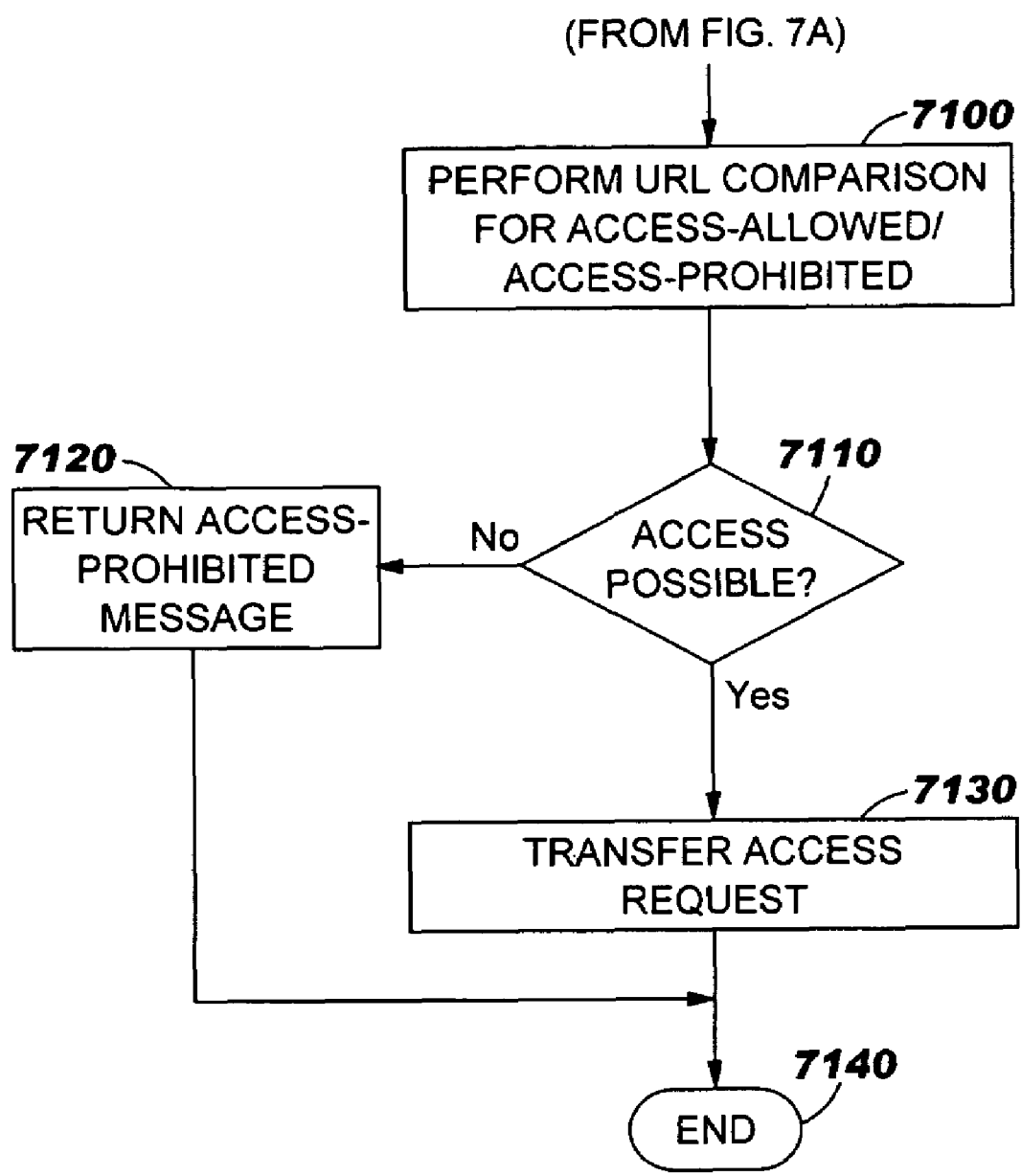

| URL PARAMETER | ALLOWED/ PROHIBITED ATTRIBUTE |
|---|---|
| http://www.ibm.com/CustomApp?confidential | ACCESS PROHIBITION |
| http://www.ibm.com/CustomApp?--common documents | ACCESS PROHIBITION |

FIG. 10 http://www.ibm.com/CustomApp?--common documents

FIG. 11

--common documents

FIG. 12 http://www.ibm.com/CustomApp?--character string

FIG. 13

--character string

METHOD AND SYSTEM FOR SECURE URL-BASED ACCESS CONTROL

BACKGROUND OF THE INVENTION

The present invention relates generally to network security and more particularly to access control in a proxy server.

It is important to prevent unauthorized access to a server via an external network such as the Internet. It is also important to prevent unauthorized access to a server from an intranet. To address these problems, it was known to utilize a proxy server logically situated between the external network and the server, and between clients on an intranet and a server on the intranet. When a proxy server forwards an access request from an intranet it is functioning as a "forward proxy". In such a case, the proxy server performs access control by checking an access control list to determine whether or not forwarding of the access request is permitted. When a proxy server forwards an access request from an external network, it is functioning as a "reverse proxy". In such a case, the proxy server performs access control by checking an ACL to determine whether or not forwarding of the access request is permitted.

Various access control techniques using proxy servers currently exist such as access control based on Uniform Resource Locator ("URL") (hereinafter referred to as URL-based access control). The URL is the address location of resources on a TCP/IP network such as the Internet or an intranet. IBM Tivoli Access Manager (tm) product is a known software product using URL-based access control. The following is an example of a computer system using the current IBM Tivoli Access Manager (tm) product. The system includes a proxy server, a client and a Web server. The proxy server is connected to the client by network connection through the Internet. The proxy server is connected to the Web server by network connection through an intranet, and has an ACL. An ACL, such as shown in FIG. 9, contain information necessary for determining which URLs are allowed to be access through the external network and/or which URLs are not allowed (i.e. prohibited) to be accessed through the external network. In ACL 107 shown as an example in FIG. 3, the URL "http://www.ibm.com/CustomApp?confidential" and the URL shown in FIG. 10 are entered as URLs to which access is not allowed (access-prohibited URL).

The access control is performed as follows. The proxy server receives an access request (for example, as an HTTP request) from a client. Then, the proxy server compares the sequence of characters of the destination URL in the access request with the sequences of characters of the access-prohibited (or access-allowed) URLs from the ACL, and thereby determines whether access should be allowed or prohibited for the access request. If access is permitted, the proxy server forwards (transfers) the access request to the Web server indicated by the destination URL. The Web server receiving the forwarded access request responds with data to the proxy server. The proxy server forwards the received response data to the client that made the access request, and ends the session. However, if access was not permitted as a result of the comparison with the ACL, the proxy server returns an access prohibition message to the client without forwarding the access request to the Web server. The session then ends.

Consider now a specific example using IBM Tivoli Access Manager product at the proxy server where the destination, URL "http://www.ibm.com/CustomApp?confidential" is sent from the client to proxy server via the external network. In this case, because the URL ("http://www.ibm.com/CustomApp?confidential") is entered as an access-prohibited URL in the ACL, the proxy server determines that access is not permitted. The access request is not forwarded to the Web server and the client cannot obtain the resource designated by the URL. Consider another specific example using IBM Tivoli Access Manager product at the proxy server where the destination URL "http://www.ibm.com/CustomApp?public" is sent from the client to the proxy server via the external network. In this case, because the URL ("http://www.ibm.com/CustomApp?public") is not entered as an access-prohibited URL in the ACL, the proxy server determines that access is permitted. The access request is forwarded to the Web server and the client can obtain the resource (e.g., a Web page) existing in the network address location/web server designated by the URL.

An HTTP access request by the client may need to include in the destination URL a character other than single-byte codes. For example, there are double byte alphanumeric characters such as a hiragana or a kanji in Japanese characters and computer-readable binary code. However, sending such an HTTP access request directly to a network is not generally allowed according to the HTTP protocol. Therefore, it is necessary for the client to encode the sequence of non single-byte characters of a destination URL with a suitable encoding method to reduce it to single-byte codes only. Then, the resulting access request can be sent onto the network.

Consider a specific example in which an access request includes a destination URL shown in FIG. 10 containing Japanese characters formed of double-byte codes, and in which UTF-8 is used as an encoding format to reduce it to single-byte codes. In this case, the sequence of characters of the destination URL is encoded into a sequence of characters "http://www.ibm.com/CustoIApp?%E4%88%80%E8%88%AC%E6%96%87%E6%9B%B 8" formed only of single codes using UTF-8 to be sent onto the network. The proxy server receives the access request including the encoded destination URL ("http://www.ibm.com/CustomApp?%E4%B8%80%E8%88%AC%E6%96%87%E6%9B% B8") and decodes the sequence of characters of the destination URL back to double-byte characters. Then, the proxy server compares the decoded character sequence shown in FIG. 10 of the destination URL with the sequences of characters of the access-prohibited URLs obtained by using the ACL, to determine if access is allowed or prohibited. Because the URL shown in FIG. 10 is entered as an access-prohibited URL in the ACL shown as an example in FIG. 6, the proxy server determines that access is not permitted, and does not forward the access request.

There are various encoding formats other than UTF-8, such as Shift-JIS and EUC (Extended Unix® Code). In some cases, the encoded destination URL in an access request sent from the client to the network to access a resource on the Web server varies depending on the encoding format used by the client. Consequently, there is a possibility that use of an encoded URL character sequence to determine whether to allow or prohibit access using the conventional URL-based access control will lead to generation of a security hole if the wrong decoding algorithm is used. For example, in a case where encoding of an access request using an access-prohibited URL as a destination URL is performed by Shift-JIS in the browser, there is a possibility of erroneous determination of access-allowed/access-prohibited in the proxy by decoding using EUC algorithm. In such a case, the access request may be allowed when it should be prohibited. The problem worsens when different encoding formats are permitted for a sequence of characters having a destination URL in an HTTP request including a double-byte code (a Japanese character or the like). For example, in the case of invoking a resource existing at the URL shown in FIG. 10, Microsoft Internet Information Server (R) (IIS) program accepts either a URL expressed by the encoding format UTF-8 or a URL expressed by the encoding format Shift-JIS with respect to the portion of the URL sequence shown in FIG. 11.

Published Unexamined Patent Application No. 2000-33085 (Patent Document 1) discloses an information transmitting and receiving system 30 having a security management section 33 which checks whether access to a designated URL is permitted. In Published Unexamined Patent Application No. 2000-33085, however, only single-byte codes are included in a URL character sequence.

Published Unexamined Patent Application No. 2000-20444 (Patent Document 2) discloses a function-expanded apparatus enabling inclusion of an arbitrary sequence of characters (a sequence of kanji, hiragana, and/or katakana characters, symbols or the like) in URL. In Published Unexamined Patent Application No. 2000-20444, however, description is made only of improving the expression of a URL character sequence by enabling inclusion of arbitrary sequence of characters. No mention is made of access control with respect to a URL containing a kanji character or the like.

An object of the present invention is to provide secure access control in a proxy server for access requests which include an encoded sequence of characters as a destination address location.

A more specific object of the present invention is to provide secure access control in a proxy server for access requests which include a URL containing a character other than single-byte codes as a destination URL.

SUMMARY OF THE INVENTION

The invention resides in a system, method and program product performed by a proxy server which forwards an access request from a client to a data server and forwards response data from the data server to the client. A first address location and an encoding format of the response data are stored. A subsequent access request from the client which includes a second address location encoded by the encoding format is received. The second address location is compared to the first address location to determine if the second address location is related to the first address location. In response to a determination that the second address location is related to the first address location, the second address location is decoded based on the encoding format.

According to features of the present invention, the data server is a web server, the response data is a web page, and the second address location includes the first address. For example, the second address location is an extension of the first address location.

According to another feature of the present invention, access-allowed or access-prohibited is determined for the access request based on the decoded second address location; and the access request is transmitted to the data server if the determination is that access is allowed for the access request. The determination can be made by comparing the decoded second address location with a list of allowed addresses or prohibited addresses previously stored in the proxy server.

According to another feature of the present invention, the first address location is a location of a web page currently displayed on a client system when a user of the client system selects the second address location.

According to another feature of the present invention, the access request is an HTTP request, the first address location is a URL of a home page, the response data is the home page and the encoding format is an attribute value of "charset" of the response data.

According to another feature of the present invention, the encoding format is UTF-8, EUC, Unicode or Shift-JIS.

BRIEF DESCRIPTION OF THE FIGURES

FIGS. 7(A) and (B) form a flowchart of other access control processing of a client request according to the present invention where the destination address is encoded.

FIG. 10 is a sample of URL with a parameter.

FIG. 11 illustrates a portion of a URL sequence that can be processed according to the present invention.

FIG. 12 illustrates for which an access request may be created according to the present invention.

FIG. 13 illustrates a URL representing a sequence of characters that may be input according to the present invention.

DETAILED DESCRIPTION OF THE INVENTION

Figure 1:
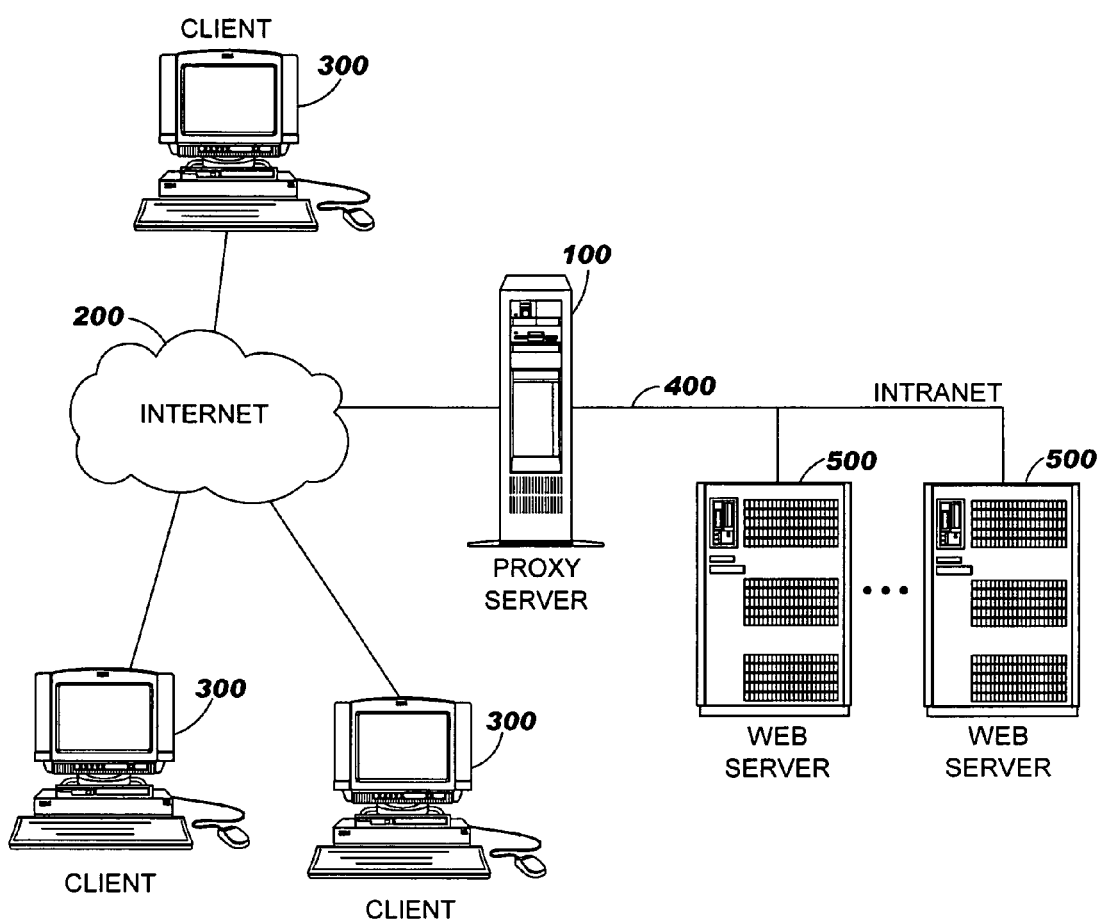
FIG. 1 is a block diagram of a computer system in which the present invention is installed and used.

An embodiment of the present invention will now be described below in detail with reference to the figures, wherein the same components are indicated by the same reference numerals throughout. The present invention can be embodied in hardware or in software recorded on a computer readable medium. In the illustrated embodiment, the proxy server functions as a reverse proxy. However, it should be noted that according to the present invention, the proxy server could also be a forward proxy and function in an analogous manner as described below. In the illustrated embodiment, access control is performed using a sequence of characters from a URL. However, the present invention can be applied to any environment where the address location of a resource on a network can be expressed by a sequence of characters.

FIG. 1 illustrates a computer system in which an access control method in accordance with the present invention is used. The system includes a proxy server 100 connected by a network connection to Internet 200 and to an intranet 400. Clients 300 are connected by a network connection to the Internet 200. Connection between each client 300 and the Internet 200 can be made by dial-up, leased line, ADSL (Asymmetric Digital Subscriber Line), CATV (Cable Television) or the like. In the illustrated embodiment, the Internet 200 and the intranet 400 establish connections between clients and servers using TCP/IP (Transmission Control Protocol/Internet Protocol). Each Web server 500 can include application software for the intended application such as Microsoft Internet Information Server (R) (IIS) or Apache software. Web servers 500 are connected by a network connection to the intranet 400, and via the intranet to the proxy server 100. In the Internet 200 and the intranet 400, clients and servers communicating with each other are identified by IP addresses expressed as global or local addresses.

The proxy server 100 receives through the Internet 200 an access request from one of the clients 300 for one of the Web servers 500. The access request can be in the form of an HTTP request. The proxy server 100 makes a determination, based on comparison to ACL 107 (FIG. 3) whether or not forwarding of the access request to the Web server 500 is permitted. If the proxy server 100 determines that forwarding is permitted, it forwards the access request to the Web server 500 through the intranet 400. Proxy server 100 receives data responsive to the forwarded access request from the Web server 500 via intranet 400, and then forwards the responsive data to the client 300 via the Internet 200.

Figure 2:
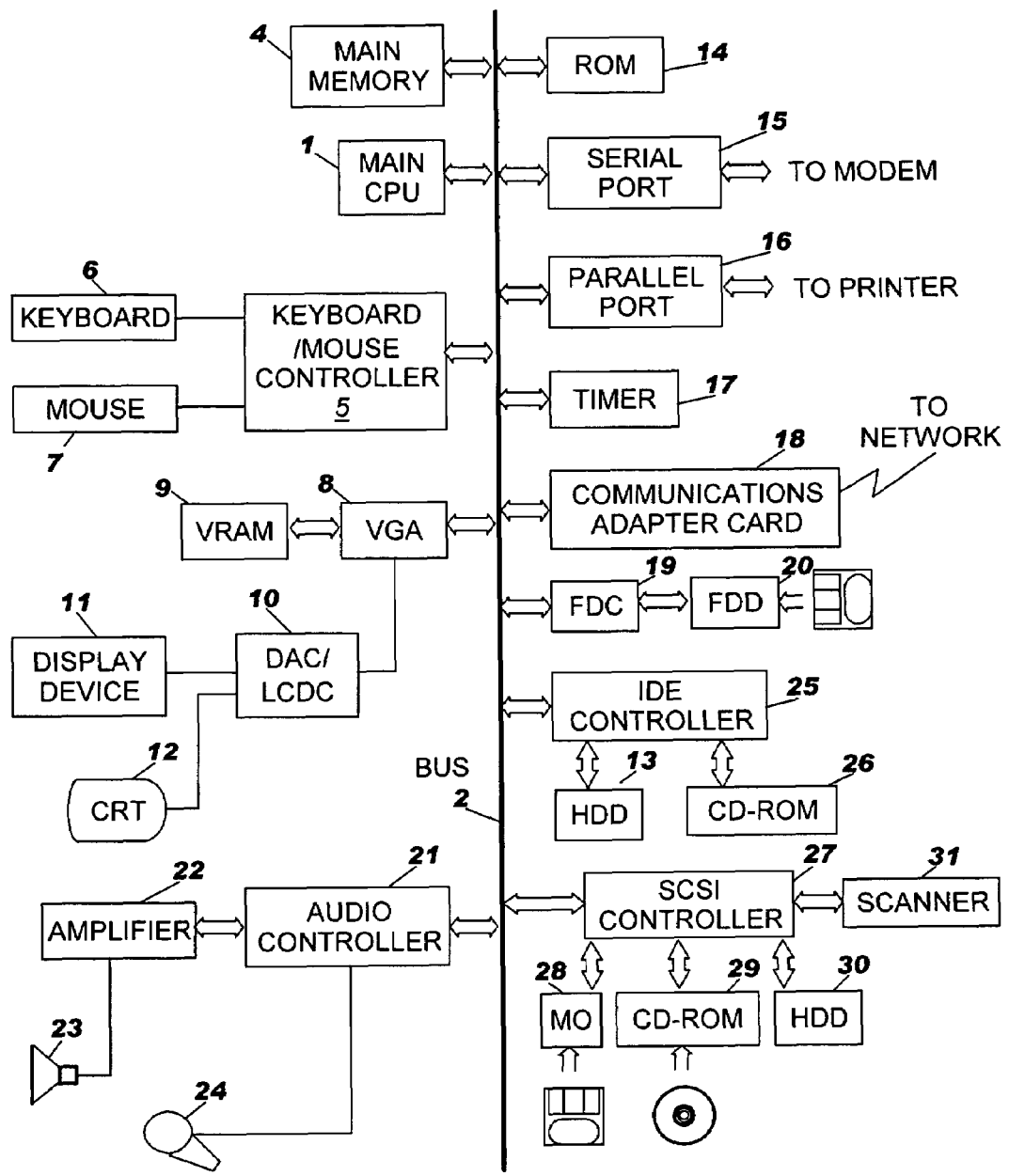
FIG. 2 is a block diagram of a proxy server within the computer system of FIG. 1.

FIG. 2 illustrates the components of the proxy server 100 according to one embodiment of the present invention. The server 100 has a central processing unit (CPU) 1 and a main memory 4. The CPU 1 and the main memory 4 are connected through a bus 2 to a hard disk device 3 provided as an auxiliary storage device. Removable storages (external storage systems capable of interchanging recording mediums), e.g., a flexible disk device 20, an MO device 28 and CD-ROM devices 26 and 29 are connected to the bus 2 through a flexible disk controller 19, an IDE controller 25 and a SCSI controller 27 or the like relating to them. In the removable storages, i.e., the flexible disk device 20, the MO device 28 and the CD-ROM devices 26 and 29 or the like, recording mediums such as a flexible disk, an MO and a CD-ROM are inserted. On the flexible disk and other mediums, the hard disk device 13 and a ROM 14, codes of a computer program for implementing the present invention by providing instructions to the CPU, etc., in cooperation with an operating system can be recorded. The computer program can be executed by being loaded into the main memory 4. The computer system may further have, as user interface hardware, a pointing device 7 such as a mouse, a keyboard 6 and a display 12 for presenting visual data to a user. The computer system can be connected to a printer (not shown) through a parallel port 16 and to a modem (not shown) through a serial port 15. The computer system can communicate with another computer or the like by connecting to the network through the serial port 15 or the modem or through a communication adapter 18 Ethernet card or a token card or the like. A speaker 23 receives through an amplifier 22 an audio signal D/A converted (digital-to-analog converted) by an audio controller 21, and outputs the signal as sound. The audio controller 21 enables audio information to be taken into the system from the outside of the system by performing A/D conversion (analog-to-digital conversion) of audio information received from a microphone 24. Preferably, each of the proxy server 100, the clients 300 and the Web servers 500 is provided with software such as an operating system or middleware for making full use of hardware resources. The proxy server 100 and the Web server 500 can be a computer in eServer pSeries (R), i.e., a server computer having IBM AIX (R) operating system. Each client 300 can be a personal computer (PC) having Microsoft Windows® 2000 (R) operating system.

Figure 3:
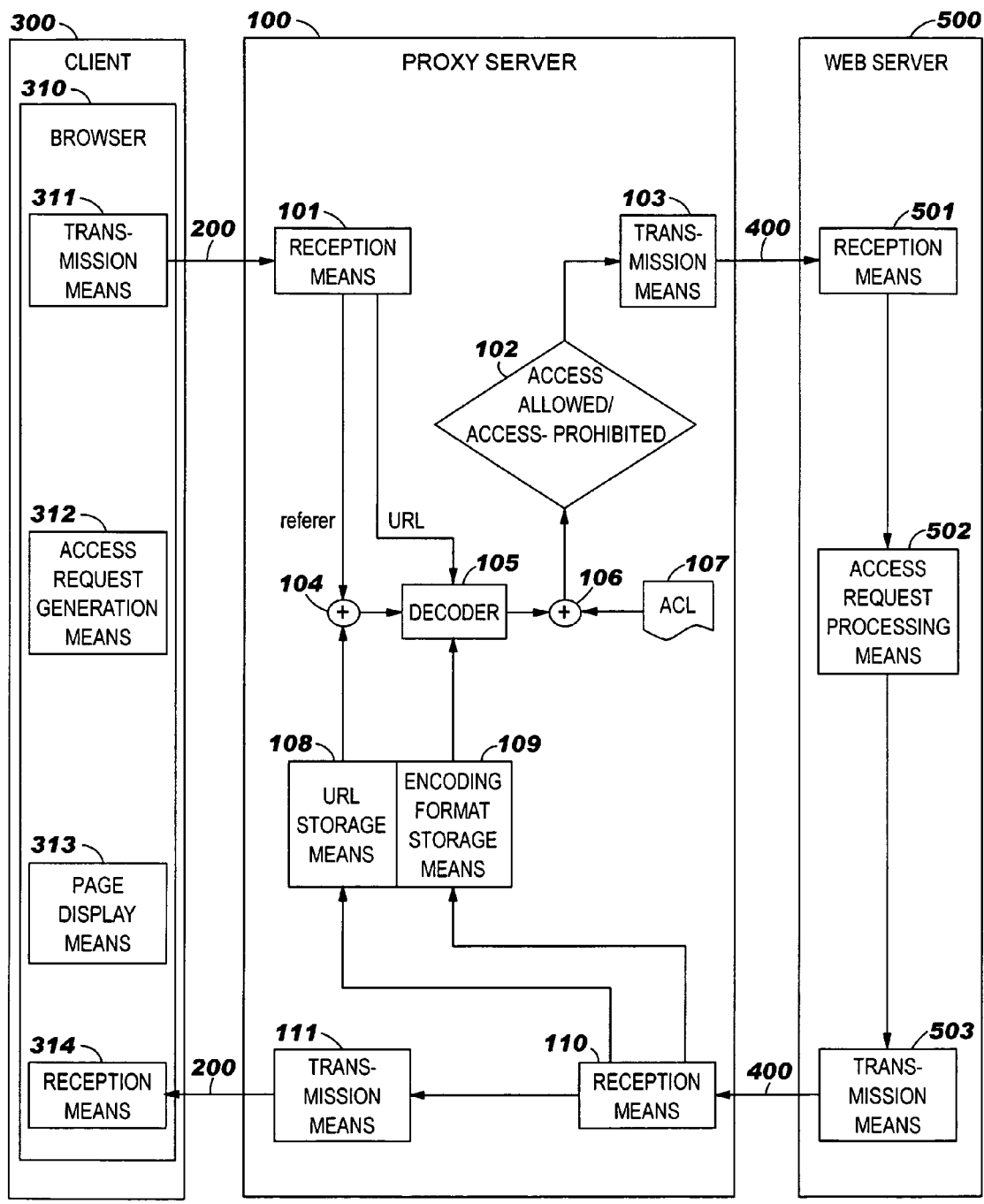
FIG. 3 is a functional block diagram of a proxy server, a client and a Web server within the computer system of FIG. 1.
Figure 4:
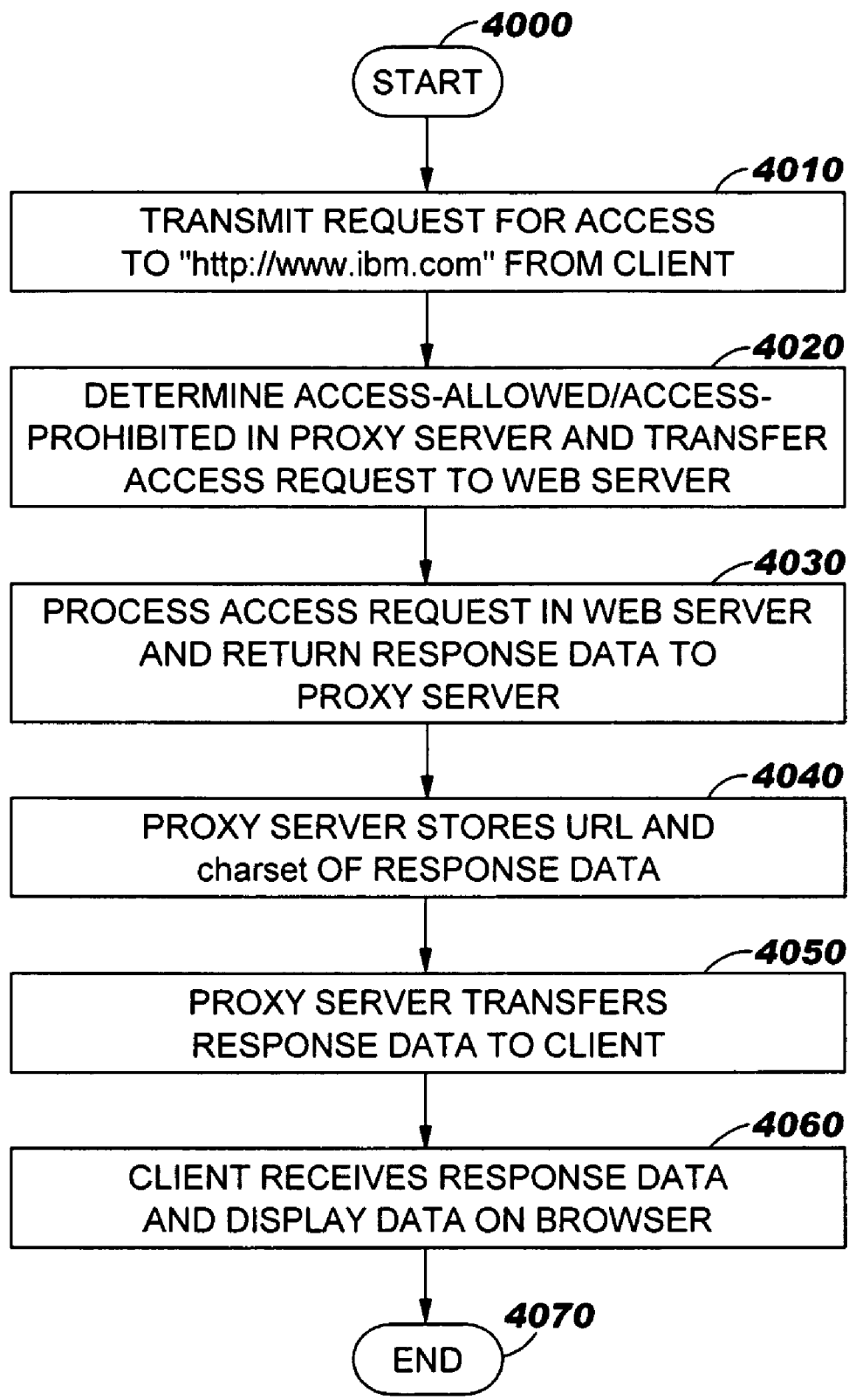
FIG. 4 is a flowchart of certain access control processing of a client request according to the present invention where access is permitted.

FIG. 3 is a functional block diagram of the proxy server 100, client 300 and Web server 500. The client 300 includes browser 310. The browser 310 can include any Web browser such as Microsoft Internet Explorer (R) browser or Netscape Navigator (R) browser. The browser 310 also includes a transmission means 311 and an access request generation means 312. The access request generation means 312 generates the access request, for example, an HTTP web page request. The transmission means 311 transmits the generated access request to the proxy server 100 through the Internet 200.

The proxy server 100 includes a reception means 101, an access-allowed/access-prohibited determination means 102, a transmission means 103, a first URL comparison means 104, a decoder 105, a second URL comparison means 106, an access control list (ACL) 107, a URL storage means 108, an encoding format storage means 109, a reception means 110, and a transmission means 111. The reception means 101 receives an access request from the client 300 and stores the sequence of characters of the destination URL specified in the access request. For those current access requests which are references from the currently displayed web page at the client, the current access request includes as the beginning part of the referenced URL, the sequence of characters of the previously downloaded URL. For example, if the currently displayed web page is "http://www.ibm.com", a referenced web page selected by a link on the currently displayed web page may be "http://www.ibm.com/CustomApp". In such a case, the URL of the currently displayed web page is the value of the attribute "referer".

In those cases where the access request includes non single-byte character codes, the client 300 encoded them to single character codes before transfer to the Internet and proxy server. Next, a determination is made whether access should be permitted for this request. If the access-allowed/access-prohibited determination means 102 determines that access is permitted, the transmission means 103 transfers the access request to the Web server 500 through the intranet. Then, the Web server 500 fetches the requested data, and the transmission means 503 transfers it to the reception means 110 of the proxy server 100. In those cases where the responsive data includes non single-byte character codes, the web server 500 encodes it to single-byte character codes before transmission to the intranet and proxy server 100. Then, the reception means analyzes the response data and transfers the response data received to the client 300 through the Internet 200.

The following is an explanation of the determination whether to permit access. From the response data which is received, the URL storage means 108 stores the sequence of characters of the URL where the response data resides in the Web server 500. Also from the response data, the encoding format storage means 109 stores an attribute value indicative of the encoding format (character codes) for the response data. The response data can be a Web page in the HTML format. In such a case, the value of the attribute "charset" in the Web page is the value stored in the encoding format storage means 109. The value of the attribute "charset" represents character codes on the Web page and is stored in storage means 109. The first URL comparison means 104 compares (a) the sequence of characters of the URL which is specified by the browser 310 in the current access request (the "referrer") and stored in the reception means 101, and (b) the sequence of characters of the URL stored in the URL storage means obtained from the last response data, i.e. the URL of the response data downloaded to the client 300 pursuant to the client's previous access request. If the result of this comparison is "coincidence", the first URL comparison means 104 instructs the decoder 105 to decode the sequence of characters of the destination URL in the access request. The decoding format corresponds to the encoding format stored in the encoding format storage means 109. (This should be the appropriate decoding format because the current web page comes from the same web site as the previous web page.) Then, the decoder 105 decodes the encoded sequence of characters of the destination URL in the access request as described below. (If the result of the comparison is not "coincidence", then a default decoding process is tried, as explained below). Next, the second URL comparison means 106 compares the sequence of characters of the destination URL output from the decoder 105 to the ACL 107 to determine whether access-allowed or access-prohibited. Some of the listed destinations are indicated as prohibited. In the illustrated example, the ACL 107 lists "http://www.ibm.com/CustomApp?confidential" and the URL shown in FIG. 10 as access-prohibited URLs. Conversely, the ACL can indicate destination URLs to which access is allowed.

Web server 500 includes a reception means 501, an access request processing means 502 and a transmission means 503. The reception means 502 receives through the intranet 400 an access request from the client 300 transferred (and decoded, if necessary) from the proxy server 100, and delivers the received access request to the access request processing means 502. The access request processing means 502 responds to the received access request by fetching suitable data such as a web page from a storage device (and modifying the data, if needed, to generate the proper response data). Then, the access request processing means delivers the response data to the transmission means 503. The transmission means 503 transmits the response data to the proxy server 100 through the intranet 400. The browser 310 of the client 300 further includes a page display means 313 and a reception means 314. The reception means 314 obtains the response data (for example, the requested web page) from the proxy server 100 through the Internet 200. The page display means 313 presents the response data received by the reception means 315 to a user through a display device or the like.

Figure 6:
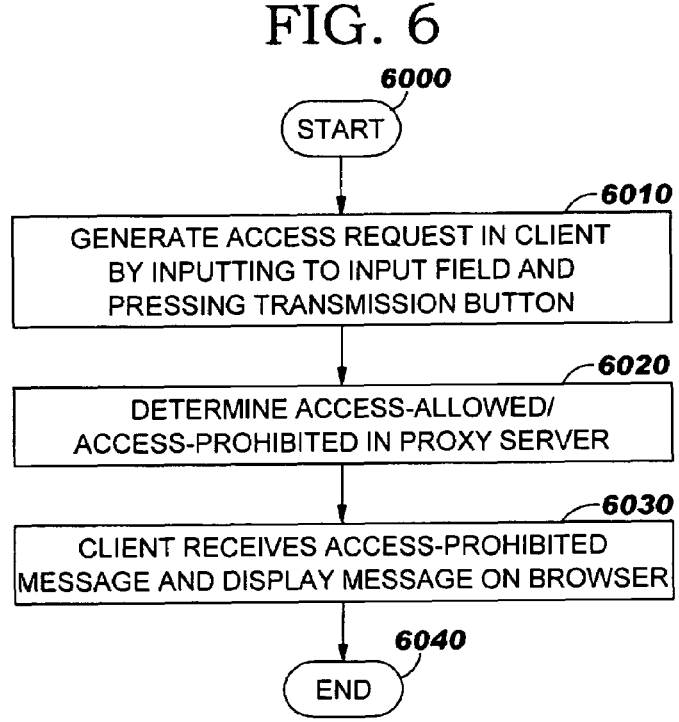
FIG. 6 is a flowchart of certain access control processing of a client request according to the present invention where access is denied.

The flowcharts of FIGS. 4 and 6 to 8 illustrate operation of the system where the client 300 initially makes a request for access to a home page (assumed to have a URL such as "http://www.ibm.com") in the Web server 500 and thereafter tries to access the URL shown in FIG. 10 by using a CGI (Common Gateway Interface) field in the home page. However, this latter web page is an access-prohibited URL. The operation of the system when the client 300 makes a request for access to the home page "ttp://www.ibm.com" in the Web server 500 (hereinafter referred to as "first session") will first be described with reference to the flowchart of FIG. 4. The process starts from step 4000. In step 4010, the client generates an access request using "http://www.ibm.com" as a destination URL. The browser 310 generates this access request in response to (a) a user operating a mouse or the like to click a hyperlink on a Web page displayed on the browser, (b) a user operating a keyboard or the like to directly input the URL to the address bar of the browser, or (c) an operation in accordance with a program such as an applet for automatically making the browser generate a URL transition event. In the illustrated embodiment, the access request is made in accordance with HTTP protocol such as HTTP1.1 described in RFC2616 managed by the IETF (Internet Engineering Task Force). The access request is transmitted from the client 300 to the proxy server 100 through the Internet 200. In the first session, the sequence of characters of the destination URL ("http://www.ibm.com") in the access request is formed only of single-byte codes. Therefore, encoding is not required or performed on the sequence of characters of the destination URL. So, the generated URL is sent directly onto the network, undergoes IP address conversion in a DNS server (not shown), and arrives at the proxy server 100. Because the sequence of characters of the destination URL ("http://www.ibm.com") in the access request is formed only of single-byte codes, decoding (by decoder 105) is unnecessary for comparison to ACL 107. So, decoder 105 outputs the sequence of characters of the destination URL to comparitor means 106 without processing it. In step 4020, the proxy server 100 determines access-allowed or access-prohibited for the access request. This determination is made by comparitor means 106 comparing the sequence of characters of the destination URL in the access request with those in the ACL 107. In the first session, in the illustrated example, because "http://www.ibm.com" is not an access-prohibited URL in ACL 107 as shown in FIG. 6, the result of the comparison is "access-allowed". Consequently, the proxy server 100 (transmission means 103) transfers the access request to the Web server 500 (reception means 501) through the intranet 400.

Figure 5:
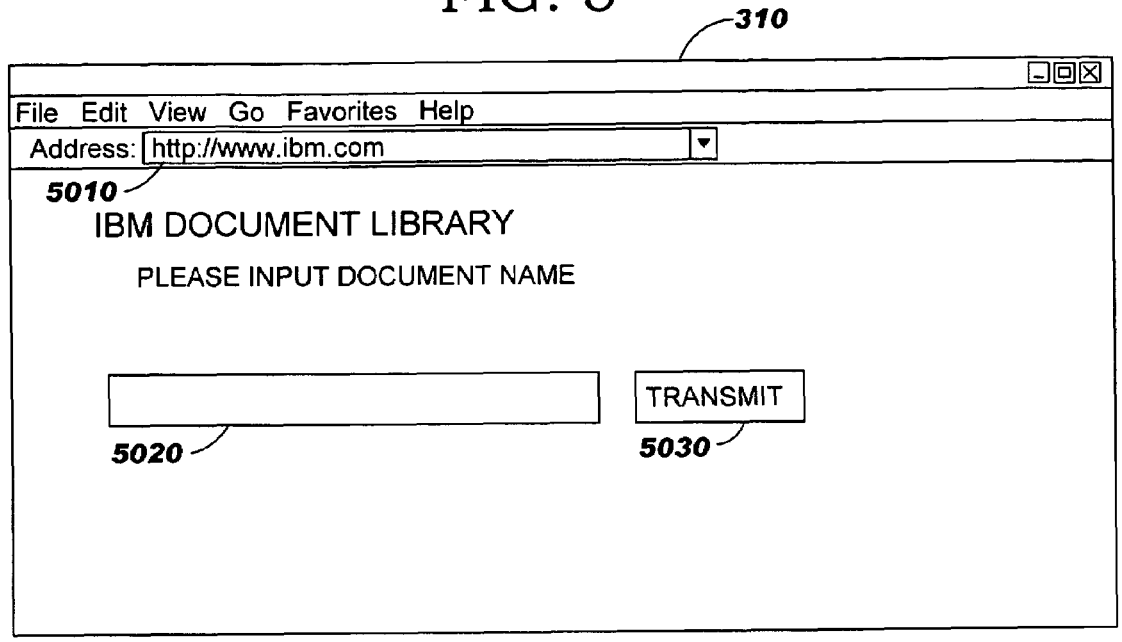
FIG. 5 is a display screen of a home page in the Web server of FIG. 2.

Next, the Web server 500 receiving the access request from the proxy server 100 prepares response data (such as by fetching the requested web page), and transmits the response data to the proxy server 100 (step 4030). Next, the proxy server 100 receives the response data from the Web server 500, and records the URL "http://www.ibm.com" and the encoding format (i.e., the attribute value charset) of the response data (step 4040). In the illustrated embodiment of the present invention, the encoding format of the response data is assumed to be Shift-JIS because Shift-JIS is one of the most popular encoding formats on a proxy server in Japan. (It is usually that the web server encodes double-byte characters in the response data.) Then, proxy server 100 transmits the response data to the client 300 (step 4050). The client 300 receives the response data, for example, a home page ("http://www.ibm.com") on the Web server 500 and displays this data on the browser 310 of the client 300. FIG. 5 shows an image of this browser display of a responsive home page. Then, proxy server 100 ends the first session with respect to the access request using "http://www.ibm.com". FIG. 6 illustrates the operation of the system (second session) in a case where access to the URL sequence shown in FIG. 12 is requested using a CGI (Common Gateway Interface) field in the Web page, but this is an access prohibited URL as indicated by the ACL 107. The sequence of characters is input to a CGI field 5020 in the Web page displayed on the browser 310 shown in FIG. 5 by using a keyboard or the like. Subsequently, when a mouse pointer is set to a transmission button 5030 and the mouse is clicked, an access request is created for the sequence shown in FIG. 12. The sequence shown in FIG. 13 in the URL represents the sequence of characters input to the field 5020 as a destination URL. This URL includes the sequence of characters of the home page, i.e. the URL at which response data was previously downloaded to the client 300 and currently displayed on the client computer 300. The URL of the previously requested web page is stored in the reception means 101 and included as the value of the attribute "referer". [[The destination URL in the current access request is encoded by the encoding format of the home page previously accessed (downloaded) and is sent out to the network. This can be accomplished using a CGI technique or the like.]]

The foregoing process starts from step 6000. In step 6010, a sequence of characters shown in FIG. 11 is input to the input field 5020 in the Web page displayed on the browser 310 and the transmission button 5030 is pressed. Then, an access request using the sequence shown in FIG. 11 as a destination URL and having "http://www.ibm.com" as the referer is generated. In step 6010, the access request generation means 312 encodes the sequence of characters of the destination URL using encoding process by the browser 310. Encoding is performed based on the encoding format of the web page previously downloaded and having its URL included in the access request. The encoding format is determined from the Charset field of the web page previously downloaded, for example, the home page whose URL is "http:/www.ibm.com". In the foregoing example, Shift-JIS was the encoding format (charset) of the home page previously downloaded, "http://www.ibm.com". Then, the transmission means 311 sends the encoded access request to the proxy server 100 through the Internet 200. Then, the proxy server 100 determines access-allowed or access-prohibited for the received access request in accordance with the flowcharts of FIGS. 7 and 8 (step 6020), as described below. In the illustrated example, access is prohibited, so the access request is not forwarded to the Web server 500. Instead, an access-prohibited message is transmitted from the proxy server 100 to the client 300. Then, client 300 displays the received access-prohibited message on the browser 310 to inform the user operating the client 300 of access-prohibited (step 6030). Then, the proxy server 100 ends the second session with respect to the access request using the sequence shown in FIG. 10 (step 6040).

Access-allowed/access-prohibited determination processing performed by the proxy server 100 in step 6020 in the second session shown in FIG. 6 will now be described in detail with reference to the flowcharts of FIGS. 7(A) and (B). The process starts from step 7000. In step 7010, the proxy server 100 receives the access request from the client 300. Because the destination URL in the received access request is encoded, decoding processing needs to be performed. In step 7020, a determination is made as to whether the destination URL can be decoded by UTF-8. (The inventor of the present invention found that almost all access requests transmitted on the Internet are encoded by UTF-8, and the processing efficiency can be improved if decoding by UTF-8 is first tried.) The determination as to whether the destination URL can be decoded by UTF-8 is made by the proxy server at first. If it is determined in step 7020 that the destination URL can be decoded by UTF-8, the process proceeds to step 7030 as indicated by the arrow "Yes". So, decoding processing by UTF-8 is performed. Then, a comparison to the ACL 107 is performed (step 7100).

Referring again to decision 7020, in the illustrated example, the result of determination is "No" because the destination URL is decoded by Shift-JIS, so processing continues with step 7040 as indicated by the arrow "No". In step 7040, a determination is made whether an encoding format (charset) attribute value is stored in the encoding format storage means 109. In the illustrated example, the attribute value Shift-JIS was stored in the encoding format storage means 109 in the first session, so processing continues with step 7050 as indicated by the arrow "Yes". In step 7050, a determination is made whether the "referer" (for example, home page) in the access request coincides with the URL stored in the URL storage means 108. The URL storage means 108 currently contains "http":://www.ibm.com" which was stored during the first session, as the referer as described above. Accordingly, the result of determination is "coincidence" and the process advances to step 7060 as indicated by the arrow "Yes". In step 7060, decoding is performed by the encoding format Shift-JIS stored in the encoding format storage means 109 to correctly restore the sequence of characters of the destination URL to the URL whose sequence is shown in FIG. 10. After decoding, the process advances to step 7100. However, if the results of determinations in either steps 7040 or 7050 is "No", the process advances to step 7070 as indicated by the arrow "No" and determination is made as to whether there are default character codes set in advance with respect to the Web server to be accessed according to the access request.

If so, the process advances to step 7080 where the sequence of characters of the destination URL is decoded by using the default character codes. After step 7080, the process advances to step 7100. Referring again to decision 7070, if there are no default character codes, the process advances to step 7090 and the sequence of characters of the destination URL is decoded by using character codes finally selected, for example, Shift JIS character codes used in the proxy server 100. After decoding in step 7090, the process advances to step 7100.

Figures 8, 9:
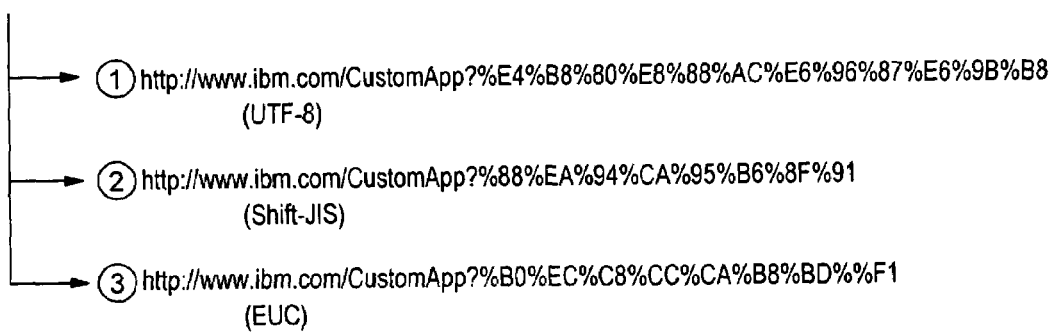
FIG. 8 is a table illustrating an access control list used in the prior art and present invention.
FIG. 9 illustrates URL character sequences before and after double-byte to single-byte encoding, which encoded character sequences can be processed according to the present invention.

Step 7100 and the successor steps are further described with reference to FIG. 8. In step 7100, the sequence of characters of the destination URL in the access request decoded in step 7030, 7060, 7080 or 7090 is compared with the sequences of characters of access-prohibited URLs obtained from the ACL 107. In the illustrated example, the sequence of characters of the destination URL in the decoded access request is the URL whose sequence is shown in FIG. 10. In the ACL 107 shown as an example in FIG. 9, the URL whose sequence is shown in FIG. 10 is entered as an access-prohibited URL. Accordingly, the result of comparison in step 7100 is "coincidence". The process advances to step 7110 and access-allowed/access-prohibited for the current access request is determined on the basis of the result of comparison in step 7100. Accordingly, the process advances to step 7120 as indicated by the arrow "No", and an access-prohibited message is returned from the proxy server 100 to the client 300. The proxy server 100 ends the process in step 7140. However, if the result of comparison in step 7100 is "No", then access-allowed is determined in step 7110 for the current access request, the process advances to step 7130 as indicated by the arrow "Yes". In step 7130, the proxy server 100 transfers the access request to the Web server 500 and the process ends in step 7140.

Based on the foregoing, the sequence of characters of a destination URL in an access request encoded at a client can be correctly decoded with high accuracy by a proxy server. Thus, the present invention enables secure URL-based access control.

The preferred embodiment of the present invention has been described for the purpose of explanation, and not limitation. Accordingly, modifications and variation can be made without deviating from the scope of the present invention. The scope of the present invention should be determined from the following claims.

The invention claimed is:

1. A method performed by a proxy server which forwards an access request from a client to a data server and forwards response data from the data server to the client, said method comprising the steps of:
    storing a first address location and an encoding format obtained from said response data;
    receiving a subsequent access request from said client which includes a second address location that is encoded;
    comparing said second address location to said first address location to determine if said second address location is related to said first address location; and
    in response to a determination that said second address location is related to said first address location, decoding said second address location based on said encoding format, wherein the second address location includes the first address location, but they are not the same.

2. The method according to claim 1 wherein said data server is a web server, said response data is a web page.

3. The method according to claim 2 wherein said second address location is an extension of said first address location.

4. The method according to claim 1 further comprising the steps of:
   determining access-allowed/access-prohibited for said subsequent access request based on the decoded second address location; and
   transmitting said subsequent access request to said data server if said determination is that access is allowed for said access request.

5. The method according to claim 4 wherein said comparing step includes the step of comparing the decoded second address location with a list of allowed addresses or prohibited addresses previously stored in said proxy server.

6. The method according to claim 1 wherein said first address location is a location of a web page currently displayed on a client system when a user of said client system selects said second address location.

7. The method according to claim 1 wherein said access request is an HTTP request, said first address location is a URL of a home page, said response data is said home page and said encoding format is an attribute value of "charset" of said response data.

8. The method according to claim 1 wherein said encoding format is UTF-8, EUC, Unicode or Shift-JIS.

9. The method according to claim 1 further comprising:
   determining whether said subsequent access request is allowed by comparing the decoded second address location to an access control list; and
   transmitting said subsequent access request to said data server if a determination is made to allow access for said request.

10. The method according to claim 9, wherein the access control list identifies address locations for which access is permitted.

11. The method according to claim 1, wherein the second address location includes a character using a byte code other than a single byte code.

* * * * *